United States Patent
Ji et al.

(10) Patent No.: US 12,302,270 B2
(45) Date of Patent: *May 13, 2025

(54) METHOD OF DYNAMIC ADJUSTING TIMING BETWEEN ADJACENT NETWORKS IN SYNCHRONIZED NETWORKS AND ELECTRONIC SHELF LABEL SYSTEM

(71) Applicant: HANSHOW TECHNOLOGY CO., LTD., Jiaxing (CN)

(72) Inventors: Yaping Ji, Jiaxing (CN); Xi Zhong, Jiaxing (CN); Guofeng Zhang, Jiaxing (CN); Qi Jiang, Jiaxing (CN); Jun Zhou, Jiaxing (CN); Min Liang, Jiaxing (CN)

(73) Assignee: HANSHOW TECHNOLOGY CO., LTD., Jiaxing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,933

(22) Filed: Apr. 8, 2024

(65) Prior Publication Data
US 2024/0292355 A1    Aug. 29, 2024

Related U.S. Application Data

(63) Continuation of application No. 18/513,485, filed on Nov. 17, 2023, now Pat. No. 11,997,626, which is a
(Continued)

(30) Foreign Application Priority Data

Jan. 8, 2023    (CN) .......................... 202310022840.7

(51) Int. Cl.
*H04W 56/00*    (2009.01)
*H04B 17/336*    (2015.01)

(52) U.S. Cl.
CPC ...... *H04W 56/0015* (2013.01); *H04B 17/336* (2015.01); *H04W 56/006* (2013.01)

(58) Field of Classification Search
CPC ........... H04W 56/0015; H04W 56/006; H04W 56/00; H04B 17/336; Y02D 30/70; G06K 19/06; H04L 27/26
See application file for complete search history.

(56) References Cited

U.S. PATENT DOCUMENTS

2012/0082038 A1    4/2012    Xu et al.
2013/0315194 A1    11/2013    Ahn et al.
(Continued)

FOREIGN PATENT DOCUMENTS

CN    101420747 A    4/2009
CN    102301804 A    12/2011
(Continued)

OTHER PUBLICATIONS

CNIPA Patent Granted Notification of Application No. CN202310022840.7, dated Mar. 26, 2023,(1p).
(Continued)

*Primary Examiner* — Ayanah S George
(74) *Attorney, Agent, or Firm* — Arch & Lake LLP; Zhangyuan Ji

(57) ABSTRACT

This disclosure provides a method of dynamically adjusting timing between adjacent networks in a synchronous network and an electronic shelf label system. The method includes: determining, by a server, a timing adjustment direction and a timing adjustment value of a current network based on an interference timing relationship diagram; generating, by the server, a corresponding adjustment task form the timing adjustment direction and the timing adjustment value of the current network, and sending the adjustment task to a master base station in the current network in the processing of each
(Continued)

of the current networks, such that the master base station and a secondary base station dynamically adjust timing based on the adjustment task.

20 Claims, 7 Drawing Sheets

Related U.S. Application Data continuation of application No. PCT/CN2023/115652, filed on Aug. 30, 2023.

(56) References Cited

U.S. PATENT DOCUMENTS

| | | | |
|---|---|---|---|
| 2014/0086089 A1 | 3/2014 | Huang et al. | |
| 2015/0172140 A1 | 6/2015 | Habdank et al. | |
| 2016/0262163 A1 | 9/2016 | Gonzalez Garrido et al. | |
| 2021/0352607 A1 | 11/2021 | Miao | |

FOREIGN PATENT DOCUMENTS

| | | | | |
|---|---|---|---|---|
| CN | 103136498 A | | 6/2013 | |
| CN | 103517321 A | * | 1/2014 | |
| CN | 108990076 A | | 12/2018 | |
| CN | 109905212 A | | 6/2019 | |
| CN | 112105004 A | * | 12/2020 | ......... G06K 17/0029 |
| CN | 113950102 A | | 1/2022 | |
| CN | 114554399 A | | 5/2022 | |
| CN | 114615747 A | | 6/2022 | |
| CN | 115510881 A | | 12/2022 | |
| CN | 115802477 A | | 3/2023 | |
| CN | 115802477 B | | 6/2023 | |
| JP | 200440645 A | | 2/2004 | |
| WO | 2019155753 A1 | | 8/2019 | |

OTHER PUBLICATIONS

The International Search Report, and Written Opinion of the International Search Authority of PCT Application No. PCT/CN2023/115652 dated on Oct. 31, 2023, (10p).

CNIPA Search Report of of Application No. CN202310022840.7, dated Mar. 22, 2023,(4p).

Liu et al., "Analysis of spectral eficiency on cel range expansion and time-domain interference coordination in heterogeneous networks", WINLab, University of Science and Technology of China, Hefei 230027, China, Journal of University of Science and Technology of China, vol. 43, No. 10. Oct. 2013, (7p).

Zhu et al., "Anti-Interference Digital Filter Method in EAS RF Label Detection System", School of Automation, Hangzhou Dianzi University, Chinese Journal of Sensors and Actuators, vol. 22. No. 12, Dec. 2009, (5p).

Zhang et al., "Solution of HARQ timing collision in dynamic TDD technology", School of Communication Engineering, Chongqing University of Posts & Telecommunications, Chongqing 400065, China, (9p).

Ying Wang, "Research on Synchronization Technology of Data Acquisition System Based Network on Chip", Jun. 24, 2020. Guilin University of Electronic Technology, (69p).

Li, et al., "Timing and Frequency Synchronization Using ZCZ Sequences for Multi-Cell OFDM Systems", 2017 3rd IEEE International Conference on Computer and Communications, (6p).

The JPOA issued in JP Application No. 2024530046 dated Jan. 7, 2025, (3p).

* cited by examiner

METHOD OF DYNAMIC ADJUSTING TIMING BETWEEN ADJACENT NETWORKS IN SYNCHRONIZED NETWORKS AND ELECTRONIC SHELF LABEL SYSTEM

CROSS-REFERENCE TO RELATED APPLICATIONS

This application is a continuation of U.S. application Ser. No. 18/513,485 filed on Nov. 17, 2023, which is a continuation of International Application No. PCT/CN2023/115652 filed on Aug. 30, 2023, which claims priority to Chinese Patent Application No. CN202310022840.7 filed on Jan. 8, 2023, both of which are hereby incorporated by reference in their entireties for all purposes.

BACKGROUND

Electronic shelf label systems are increasingly used in various retail areas with the increasing scale of stores, and a plurality of base stations need to be deployed in the stores, where the plurality of base stations communicate by establishing one or more synchronous networks, one synchronous network is used by one master base station and a plurality of secondary base stations. Timing of the secondary base stations is synchronized with that of the master base station. However, a clock of the master base station may drift, and the lower the clock accuracy, the greater a possibility of the drift, then the clock of the secondary base stations also drifts accordingly, so that synchronous networks of adjacent stores or different networks of a same store that do not conflict in time, may drift over time and interfere with each other. In addition, when the network is initially established, timing avoidance is also required between synchronous networks of adjacent stores or different networks of the same store to avoid interference caused by time conflicts.

As can be seen, synchronous networks of adjacent stores or different networks of the same store may have a problem of mutual interference as time drifts or in the initial establishment in the prior art, which reduces the synchronization accuracy and stability of the electronic shelf label system and fails to meet actual needs of the store.

SUMMARY

This disclosure relates to the technical field of communication, in particular to a method of dynamically adjusting timing between adjacent networks in a synchronous network and an electronic shelf label system.

In a first aspect, some embodiments of this disclosure provide a method of dynamically adjusting timing between adjacent networks in a synchronous network, including: controlling, by a server, each base station in the synchronous network in each scanning period to perform an interference scanning with a predetermined time duration, so that each base station sends an interference scanning result to the server, wherein the interference scanning result comprises timing characteristic information of an interfering base station, and the synchronous network comprises a current network; and determining, by the server, timing adjustment of the current network based on the interference scanning result of each base station in the synchronous network.

In a second aspect of the present disclosure, some embodiments of this disclosure provide an electronic shelf label system, and the electronic shelf label system includes a plurality of base stations, and a server communicating with the plurality of base stations. The server is configured to adjust timing by adopting a method of dynamically adjusting timing between adjacent networks in a synchronous network according to the first aspect.

In third aspect of the present disclosure, some embodiments of this disclosure provide a non-transitory computer readable storage medium for storing computer-executable instructions that, when executed by one or more computer processors, cause the one or more computer processors to perform the method according to the first aspect.

BRIEF DESCRIPTION OF THE DRAWINGS

In order to more clearly explain the embodiments of this disclosure or the technical solution in the prior art, a brief description of the drawings for the embodiments or the prior art will be given below.

DETAILED DESCRIPTION

To make the objective, technical solutions and advantages of the embodiments of the disclosure clearer, the technical solution in the embodiments of this disclosure will be described clearly and integrally below with reference to drawings in the embodiments of this disclosure, and obviously the described embodiments are merely part of the embodiments, not all of the embodiments of this disclosure. Based on the embodiments of this disclosure, any other embodiments that are obtained by those of ordinary skilled in the art without paying any creative effort should fall within the protection scope of this disclosure.

In a first aspect, some embodiments of this disclosure provide a method of dynamically adjusting timing between adjacent networks in a synchronous network, specifically including the following embodiments.

Figure 1:
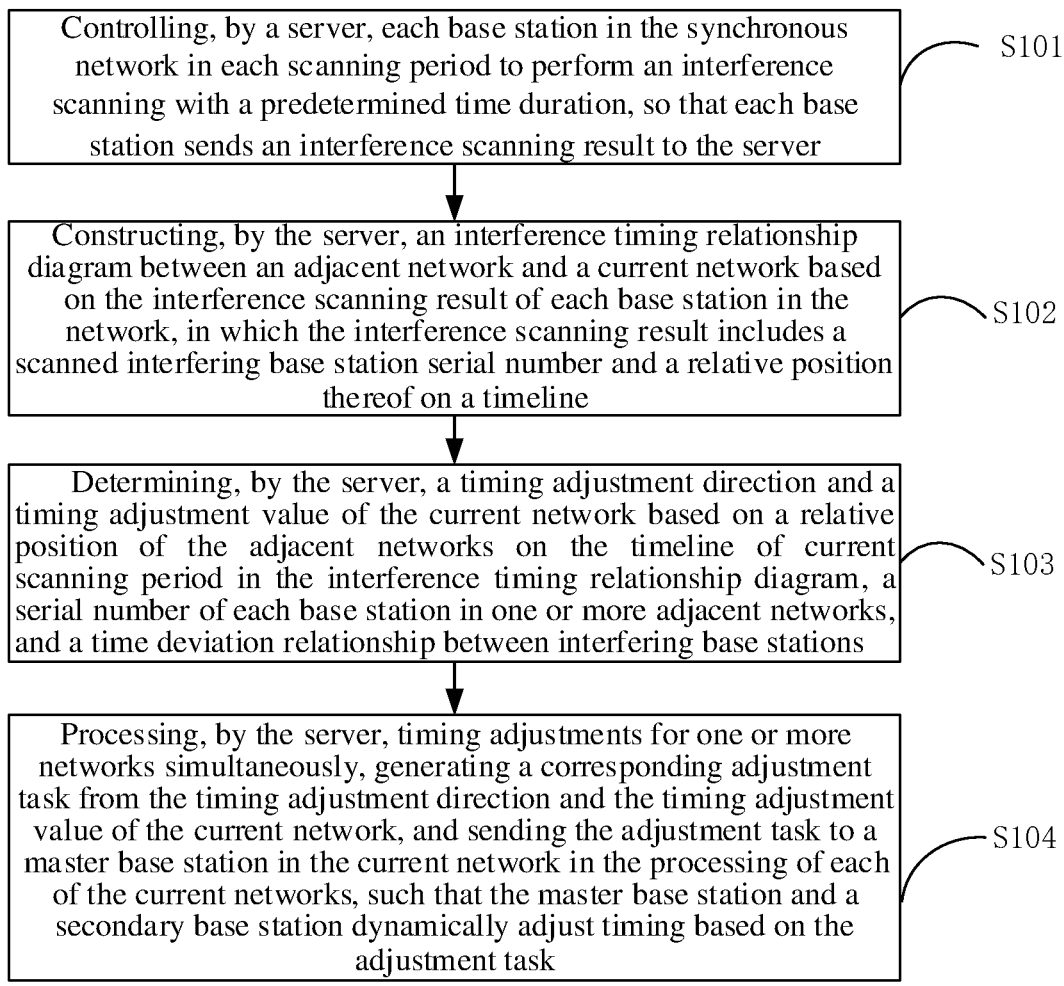
FIG. 1 is a flow schematic diagram of a method of dynamically adjusting timing between adjacent networks in a synchronous network according to an embodiment of this disclosure.

FIG. 1 is a flow diagram of a method of dynamically adjusting timing between adjacent networks in a synchronous network according to an embodiment of this disclosure. As shown in FIG. 1, when the method of dynamically adjusting timing between adjacent networks in a synchronous network is applied to an electronic shelf label system including a server, a base station and an electronic shelf label, the method specifically includes the steps of:

S101, controlling, by a server, each base station in the synchronous network in each scanning period to perform an interference scanning with a predetermined time duration, so that each base station sends an interference scanning result to the server.

Figure 2:
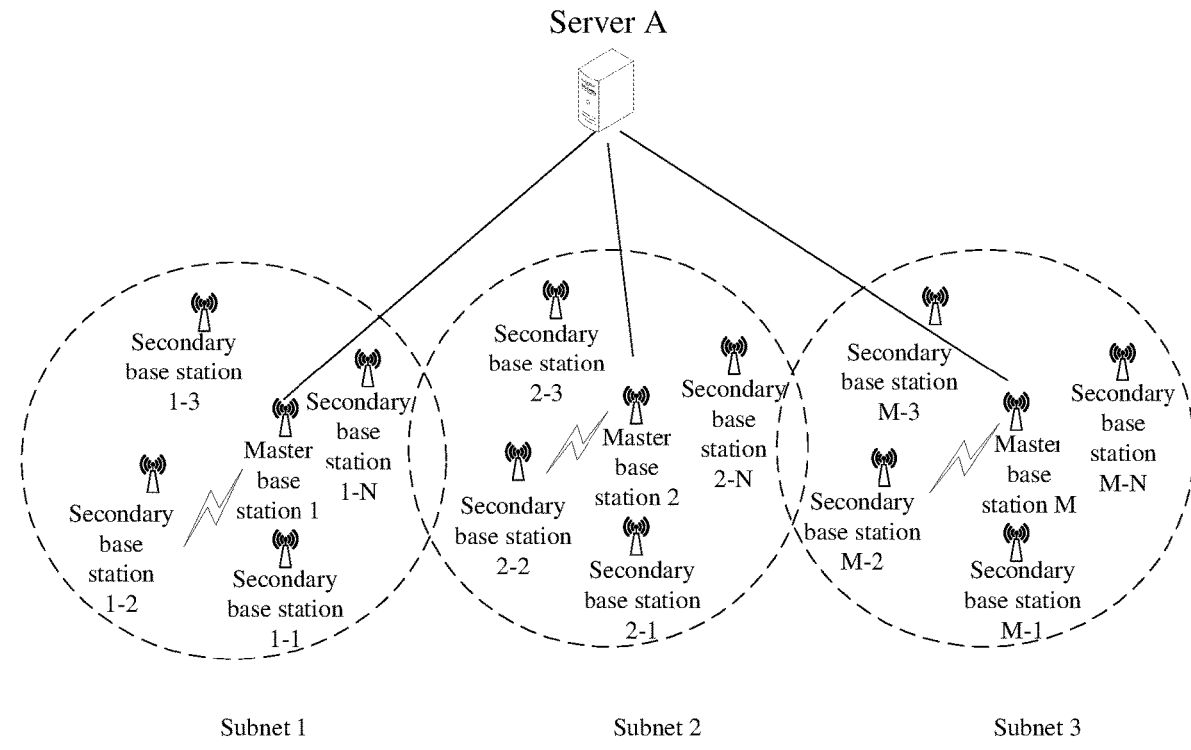
FIG. 2 is a schematic diagram of a synchronous network according to an embodiment of this disclosure.
Figure 3:
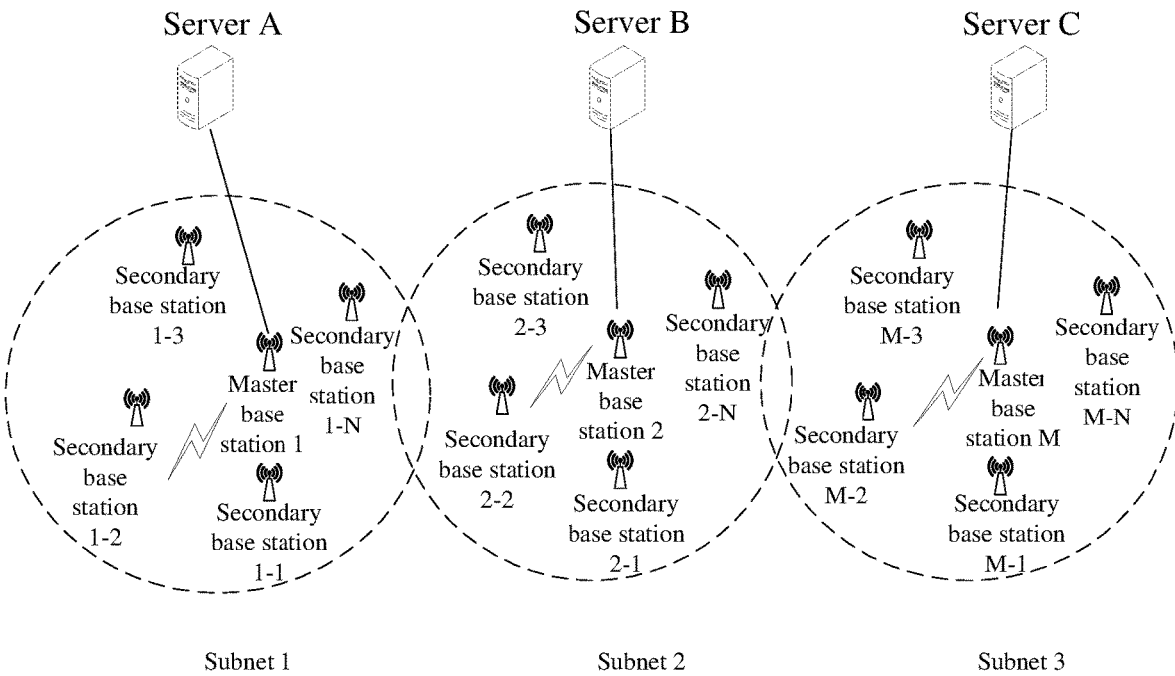
FIG. 3 is a schematic diagram of another synchronous network according to an embodiment of this disclosure.

In some embodiments, as shown in FIGS. 2 and 3, adjacent networks in this embodiment include a plurality of networks within a same store or/and a plurality of networks generated between adjacent stores.

In some embodiments, when all base stations in the synchronous network are idle, the server sends an interference scanning task to each base station, so that each base station scans the base stations simultaneously based on the interference scanning task, and generates an interference scanning result from a scanned interfering base station serial number and a relative position thereof on a timeline.

In some embodiments, when the store is initially established or the network within the store is in a synchronous state, the server judges whether the base station meets a requirement for issuing the interference scanning task every fixed period (usually 32 s). If the requirement is met, the server issues the interference scanning task to all the base stations in the store, and then waits to receive the interference scanning result reported by the base stations. After receiving the interference scanning task issued by the server, the base station scans surrounding base stations. A plurality of interfering base stations may be scanned by the same one base station. The base station reports all scanned base station serial numbers and a start moment difference between a network where a current base station is located and a network where the interfering base station is located. The base station serial number includes: a base station store number, a network number and a base station offset number. The base station offset number is a time offset number when the base station operates.

S102, constructing, by the server, an interference timing relationship diagram between an adjacent network and a current network based on the interference scanning result of each base station in the network, in which the interference scanning result includes a scanned interfering base station serial number and a relative position thereof on a timeline. In some embodiments, the interference scanning result may include other timing characteristic information of an interfering base station, which reflects the characters of the interfering base station on the dimension of time. The timing characteristic information included in the interference scanning result is not limited to the scanned interfering base station serial number and the relative position disclosed in the embodiments of the present disclosure.

In some embodiments, the above network may be a synchronous network.

Figure 4:
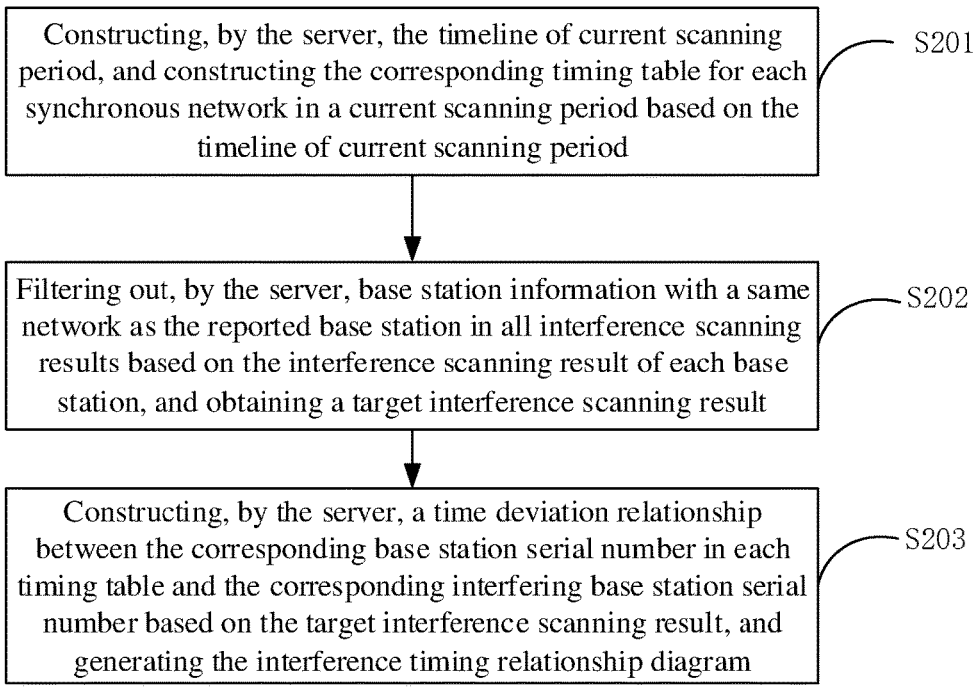
FIG. 4 is a schematic diagram of a specific process of step S101 in FIG. 1.

As shown in FIG. 4, the server constructs an interference timing relationship diagram between adjacent networks and the current network based on the interference scanning result of each base station in the network, the method specifically includes the steps of:

S201, constructing, by the server, the timeline of current scanning period, and constructing the corresponding timing table for each synchronous network in a current scanning period based on the timeline of current scanning period;

S202, filtering out, by the server, base station information with a same network as the reported base station in all interference scanning results based on the interference scanning result of each base station, and obtaining a target interference scanning result; and S203, constructing, by the server, a time deviation relationship between the corresponding base station serial number in each timing table and the corresponding interfering base station serial number based on the target interference scanning result, and generating the interference timing relationship diagram.

Figure 5:
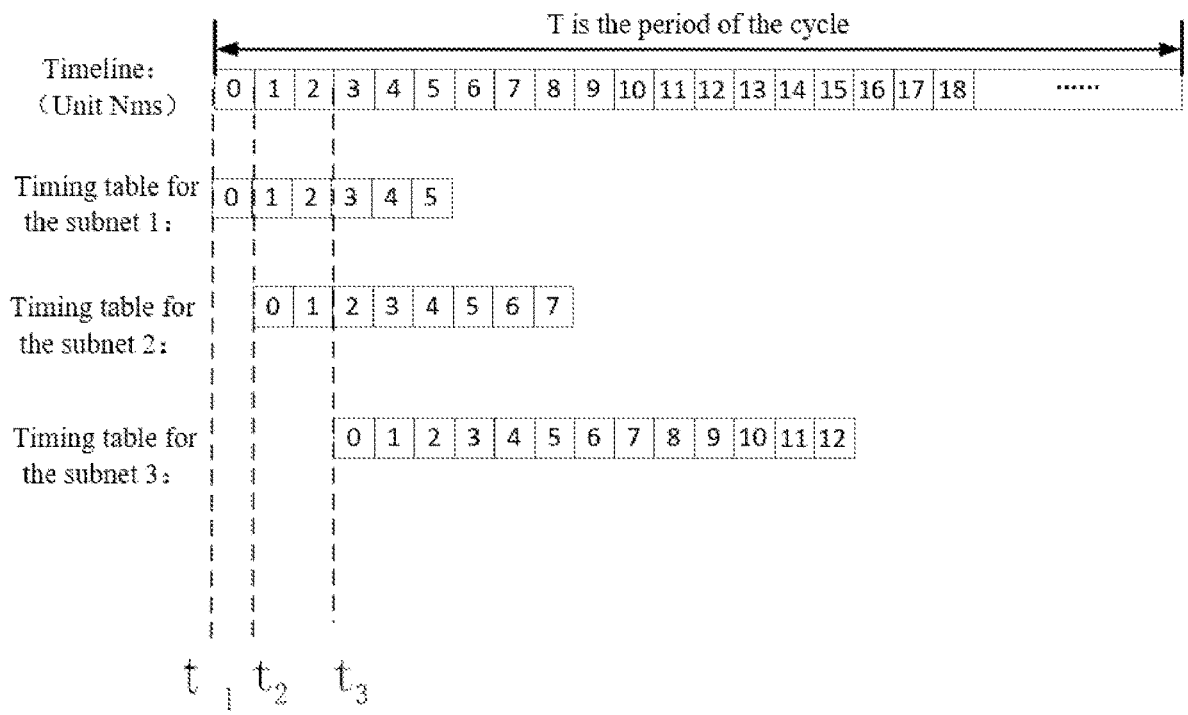
FIG. 5 is a schematic diagram of a timing table according to an embodiment of this disclosure.

As shown in FIG. 5, in this embodiment, the current scanning period is divided into a plurality of parts based on a preset interval to construct a timeline, then the corresponding timing table for each synchronous network in the current scanning period is constructed based on the timeline of the current scanning period; and the server can construct a corresponding timing table for each synchronous network in the current scanning period based on the relative position relationship of the time of reporting interfering base station serial number on the timeline of the current scanning period. The interfering base station serial number includes: a store number, a network number and an offset serial number in a network in which the base station is located.

Figure 6:
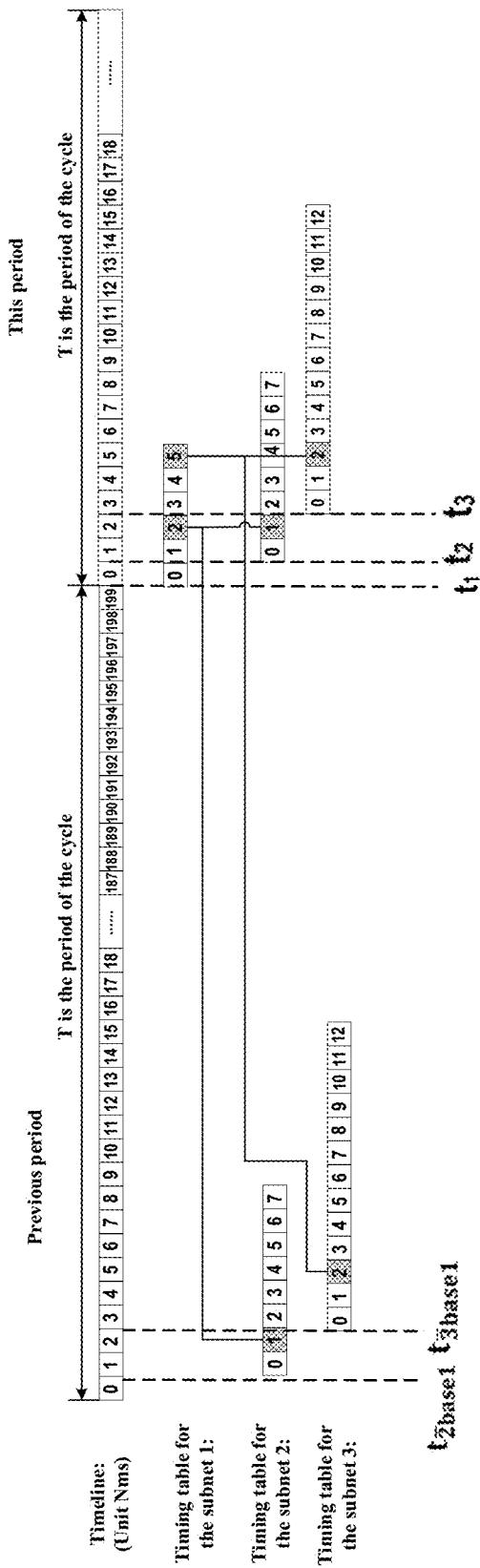
FIG. 6 is a schematic diagram of an interference timing relationship diagram according to an embodiment of this disclosure.

Further, the interference scanning result of each base station includes other base stations that can interfere with the current base station. Other base stations that generate interference may be base stations in a same one network (identical network) or base stations in other networks. Thus, the server collects results in this round reported by the base stations, filters out the scanning results with the same network as the reported base station in the results reported by the base station, and then constructs a time offset relationship between the base stations that interfere with each other, and obtains the interference timing relationship diagram as shown in FIG. 6. In FIG. 6, the base station with an offset number 2 in a network 1 interferes with the base station with an offset number 1 in a network 2, the base station corresponding to an offset number 5 in the network 1 interferes with the base station corresponding to the offset number 2 in a network 3. In this embodiment, an offset number of a master base station in each network may be 0 or other numbers, and other secondary base stations are numbered based on a relative offset from the master base station.

S103, determining, by the server, a timing adjustment direction and a timing adjustment value of the current network based on a relative position of the adjacent networks on the timeline of current scanning period in the interference timing relationship diagram, a serial number of each base station in one or more adjacent networks, and a time deviation relationship between interfering base stations.

In some embodiments, before determining the timing adjustment direction and the timing adjustment value of the current network, the method further includes: obtaining, by the server, a reference network that has an interference relationship with the current network based on the interference timing relationship diagram; obtaining a maximum base station serial number with a base station interference relationship in the current network based on the interference timing relationship diagram; determining, by the server, a mirroring direction of the reference network based on a relative position relationship between the current network and the corresponding reference network on the timeline of current scanning period; obtaining a mirroring timing table of the reference network of the current network in a corresponding period based on the mirroring direction of the reference network, in which the mirror timing table is a timing table corresponding to the mirroring network of the reference network; and judging whether the current network needs to adjust timing based on a reference network timing table of the current network and the mirror timing table of the reference network in the corresponding period.

In some embodiments, determining the timing adjustment direction and the timing adjustment value of the current network when determining that the current network needs to adjust timing based on the mirror timing table of the reference network of the current network in the corresponding period, includes: determining a first time difference between the current network and the reference network, and a second time difference between the current network and the mirroring network of the reference network, based on a start moment of the current network, a start moment of the reference network of the current network, a start moment of the mirroring network of the reference network, a moment on the timeline corresponding to a maximum interfering base station offset number of the reference network, and a moment on the timeline corresponding to a maximum interfering base station offset number of the current network; determining a first adjustment value of the current network relative to the reference network and a second adjustment value of the current network relative to the mirroring network of the reference network based on a preset interval threshold, the first time difference and the second time difference; and obtaining the timing adjustment direction and the timing adjustment value of the current network relative to the reference network based on the first adjustment value and the second adjustment value.

In some embodiments, the timing adjustment direction indicates shifting right relative to the timeline when the timing adjustment value is a positive value; and the timing adjustment direction indicates shifting left relative to the timeline when the timing adjustment value is a negative value.

In some embodiments, when two reference networks are present in the current network, a formula expression for determining the timing adjustment value of the current network includes:

$$D = \begin{cases} D_1 + D_2, & D_1 \cdot D_2 < 0 \\ D_1, & |D_1| \geq |D_2|, D_1 \cdot D_2 \geq 0 \\ D_2, & |D_2| > |D_1|, D_1 \cdot D_2 \geq 0 \end{cases}$$

where $D_1$ represents the timing adjustment value of the current network relative to the first reference network; $D_2$ represents the timing adjustment value of the current network relative to the second reference network.

In some embodiments, a formula expression for determining the first adjustment value of the current network relative to the reference network and the second adjustment value of the current network relative to the mirroring network of the reference network based on the preset interval threshold, the first time difference, and the second time difference includes:

$$d_1 = \begin{cases} -(GAP - x_1), & x_1 < GAP, t1 \leq t2 \\ 0, & x_1 \geq GAP, t1 \leq t2 \\ GAP - x_1, & x_1 < GAP, t1 > t2 \\ 0, & x_1 \geq GAP, t1 > t2 \end{cases}$$

$$d_1 = \begin{cases} GAP - x_{\bar{1}}, & x_{\bar{1}} < GAP, t1 \leq t2 \\ 0, & x_{\bar{1}} \geq GAP, t1 \leq t2 \\ -(GAP - x_{\bar{1}}), & x_{\bar{1}} < GAP, t1 > t2 \\ 0, & x_{\bar{1}} \geq GAP, t1 > t2 \end{cases}$$

where $d_1$ represents the first adjustment value, $d_{\bar{1}}$ represents the second adjustment value, GAP represents the preset interval threshold, t1 represents the start moment of the current network, t2 represents the start moment of the reference network, $x_1$ represents the first time difference, and $x_{\bar{1}}$ represents the second time difference.

In some embodiments, the reference network corresponding to each network is different. This embodiment is illustrated with the reference network corresponding to the current network as an example.

In some embodiments, the adjustment value of each network is comprehensively calculated based on the calculated distance that each network and the mirror network need to move; the direction of adjustment is determined by the positive or negative value of the adjustment value.

As shown in FIG. 6, if a network No. 1 (a subnet 1) interferes with both a network No. 2 (a subnet 2) and a network No. 3 (a subnet 3), start moments of the network 1 (a network No. 1), the network 2 (a network No. 2) and the network 3 (a network No. 3) are currently defined as $t_1$, $t_2$ and $t_3$, respectively, a start moment of the network 2 relative to a mirroring period network of the network 1 is defined as $t_{2base1}$, and a start moment of the network 3 relative to a mirroring period network of the network 1 is defined as $t_{\bar{3}base1}$, $$t_{\bar{2}base1} = \begin{cases} t_2 - 1000, & t_1 \leq t_2 \\ t_2 + 1000, & t_1 > t_2 \end{cases}$$

$$t_{\bar{3}base1} = \begin{cases} t_3 - 1000, & t_1 \leq t_3 \\ t_3 + 1000, & t_1 > t_3 \end{cases}$$

a time difference in timing between the current network 1 and the network 2 is $x_{12}$, a time difference in timing between the current network 1 and the mirror network of the network 2 is $x_{1\bar{2}}$, a time difference in timing between the current network 1 and the network 3 is $x_{13}$, and a time difference in timing between the current network 1 and the mirror network of the network 3 is $x_{1\bar{3}}$, $$x_{12} \text{ is defined as } x_{12} = \begin{cases} t_2 - (t_1 + \text{offset}_{net12} * 5), & t_1 \leq t_2 \\ t_1 - (t_2 + \text{offset}_{net21} * 5), & t_1 > t_2 \end{cases},$$

$$x_{1\bar{2}} \text{ is defined as } x_{1\bar{2}} = \begin{cases} t_1 - (t_{\bar{2}base1} + \text{offset}_{net21} * 5), & t_1 \leq t_2 \\ t_{\bar{2}base1} - (t_1 + \text{offset}_{net12} * 5), & t_1 > t_2 \end{cases},$$

where $\text{offset}_{net12}$ is a maximum conflict ap (access point) number (2 herein) between the network No. 1 and the network No. 2, and $\text{offset}_{net21}$ is a maximum conflict ap number (1 herein) between the network No. 2 and the network No. 1.

$$x_{13} \text{ is defined as } x_{13} = \begin{cases} t_3 - (t_1 + \text{offset}_{net13} * 5), & t_1 \leq t_3 \\ t_1 - (t_3 + \text{offset}_{net31} * 5), & t_1 > t_3 \end{cases},$$

$$x_{1\bar{3}} \text{ is defined as } x_{1\bar{3}} = \begin{cases} t_1 - (t_{\bar{3}base1} + \text{offset}_{net31} * 5), & t_1 \leq t_3 \\ t_{\bar{3}base1} - (t_1 + \text{offset}_{net13} * 5), & t_1 > t_3 \end{cases}$$

where $\text{offset}_{net13}$ is a maximum conflict ap number (5 herein) between the network No. 1 and the network No. 3, and $\text{offset}_{net31}$ is a maximum conflict ap number (2 herein) between the network No. 3 and the network No. 1.

Time that needs to be adjusted for the current network 1 relative to the network 2 is $d_{12}$, time that needs to be adjusted for the current network 1 relative to the mirror network of the network 2 is $d_{1\bar{2}}$, time that needs to be adjusted for the current network 1 relative to the network 3 is $d_{13}$, and time that needs to be adjusted for the current network 1 relative to the mirror network of the network 3 is $d_{1\bar{3}}$, $d_{12}$ is defined as $d_{12} =$ $$\begin{cases} -(50 - x_{12}), & x_{12} < \text{GAP}, t1 \le t2 \ (\text{GAP} = 50 \text{ ms}) \\ 0, & x_{12} \ge \text{GAP}, t1 \le t2 \\ 50 - x_{12}, & x_{12} < \text{GAP}, t1 > t2 \\ 0, & x_{12} \ge \text{GAP}, t1 > t2 \end{cases},$$

$d_{1\bar{2}}$ is defined as $d_{1\bar{2}} =$ $$\begin{cases} 50 - x_{1\bar{2}}, & x_{1\bar{2}} < \text{GAP}, t1 \le t2 \ (\text{GAP} = 50 \text{ ms}) \\ 0, & x_{1\bar{2}} \ge \text{GAP}, t1 \le t2 \\ -(50 - x_{1\bar{2}}), & x_{1\bar{2}} < \text{GAP}, t1 > t2 \\ 0, & x_{1\bar{2}} \ge \text{GAP}, t1 > t2 \end{cases},$$

$d_{13}$ and $d_{1\bar{3}}$ are defined in a similar manner.

In this embodiment, a distance $D_{12}$ that the network No. 1 needs to move relative to the network No. 2 is defined as $D_{12} = d_{12} + d_{1\bar{2}}$.

Similarly, a distance $D_{13}$ that the network No. 1 needs to move relative to the network No. 3 is defined as $$D_{13} = d_{13} + d_{1\bar{3}}.$$

Thus a value that needs to be adjusted for the network 1 is $$D = \begin{cases} D_{12} + D_{13}, & D_{12} \cdot D_{13} < 0 \\ D_{12}, & |D_{12}| \ge |D_{13}|, D_{12} \cdot D_{13} \ge 0 \\ D_{13}, & |D_{13}| > |D_{12}|, D_{12} \cdot D_{13} \ge 0 \end{cases}$$

a direction of adjustment of the network No. 1 is decided by a positive or negative result of D. If $D_1$ is positive, the network needs to shift right, whereas if $D_1$ is negative, the network needs to shift left.

To further illustrate with a specific example, the calculation process of D for the network 1 is as follows: the interference networks of the network 1 are the network 2 and the network 3.

A value $D_{12}$ that needs to be adjusted for the network 1 relative to the network 2 can be, for example, $$D_{12} = d_{12} + d_{1\bar{2}} = -(50 - (-10)) + 0 = -60.$$

A value $D_{13}$ that needs to be adjusted for the network 1 relative to the network 3 can be, for example, $$D_{13} = d_{13} + d_{1\bar{3}} = -(50 - (-15)) + 0 = -65.$$

Figure 7:
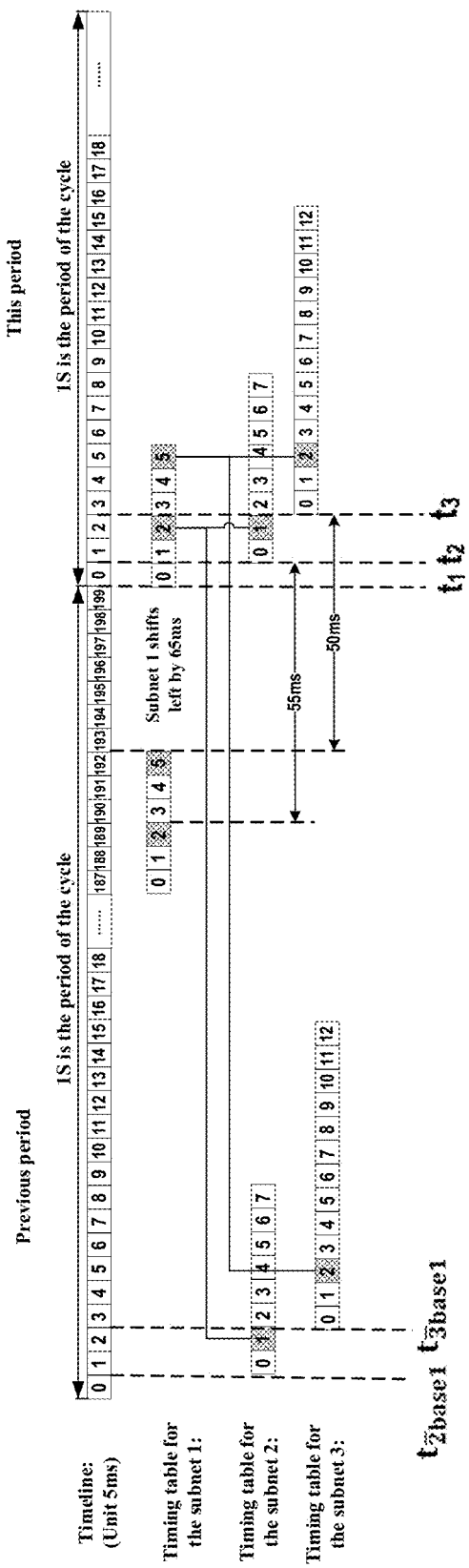
FIG. 7 is a schematic diagram of a timing table adjustment according to an embodiment of this disclosure.

Finally, $D = D_{13} = -65$, the network 1 shifts left and needs to be moved and adjusted by 65 ms with each adjustment to 1 ms. The position after timing adjustment is as shown in FIG. 7.

S104, processing, by the server, timing adjustments for one or more networks simultaneously, generating a corresponding adjustment task from the timing adjustment direction and the timing adjustment value of the current network, and sending the adjustment task to a master base station in the current network in the processing of each of the current networks, such that the master base station and a secondary base station dynamically adjust timing based on the adjustment task.

In some embodiments, the server may simultaneously process timing adjustments in some other manner, which is not limited to S104 in the embodiment of the present disclosure. In some embodiments, the server of a current network sends the adjustment task only to the master station of the current network. If the server's communication with the master station is unsuccessful, the current network is not in the synchronous network any more.

In a first implementation of this embodiment, generating, by the server, the corresponding adjustment task from the timing adjustment direction and the timing adjustment value of the current network, respectively, includes: dividing the timing adjustment value of the current network into a plurality of single adjustment values based on a preset number of adjustment times; and generating, by the server, a plurality of adjustment tasks based on the timing adjustment direction and the plurality of single adjustment values, respectively.

In some embodiments, if the timing adjustment value is 5 ms, a preset number of adjustment times is 5 times. Each single adjustment value can be 1 ms. Based on the adjustment direction and the single adjustment values, a plurality of single adjustment tasks are generated, respectively, among which, the single adjustment values may be individually equivalent or different.

In a second implementation of this embodiment, generating, by the server, the corresponding adjustment task from the timing adjustment direction and the timing adjustment value of the current network, respectively, includes: obtaining a number of current adjustment times based on the timing adjustment value and a preset single adjustment value; and generating a plurality of adjustment tasks based on the number of current adjustment times, the timing adjustment value and the preset single adjustment value.

In some embodiments, the preset single adjustment value is a fixed value for each adjustment, such as 1 ms, then the number of current adjustment times corresponding to the timing adjustment value of 5 ms is 5 times. In the current scanning period, the server generates 5 adjustment tasks and sends the adjustment tasks to the corresponding network. For example, after generating the plurality of adjustment tasks, the adjustment tasks may also be sent to the base station a plurality of times within the same adjustment period.

In some embodiments, the server can perform timing adjustments on one or more networks simultaneously.

In some embodiments, after receiving time adjustment tasks issued by the server, the base station adjusts the time of the master base station. At the same time, the synchronization time adjusted by the master base station is sent to the secondary base stations level by level, so that the time of an entire network is adjusted.

In some embodiments, the server repeatedly controls the base station to perform interference scanning based on a length of the scanning period, and cyclically performs a dynamic timing adjustment between the adjacent networks.

As compared with the prior art, the method provided by some embodiments of the present disclosure at least has the following technical benefits:

An interference timing relationship diagram between a plurality of synchronous networks is constructed based on the interference scanning result of each base station, the timing adjustment direction and the timing adjustment value of each network is obtained based on the interference timing relationship diagram, a corresponding adjustment task is generated from the timing adjustment direction and the timing adjustment value of the network, respectively, and each adjustment task is sent to the corresponding network, such that the master base station and a secondary base station in the network dynamically adjust timing based on the adjustment task, achieves an objective of mutual timing avoidance between the networks and solves the problem of signal interference caused by overlap in timing between networks in the same store and networks in the adjacent stores as time drifts or in the initial establishment, and improves the communication stability of the synchronous networks.

Figure 8:
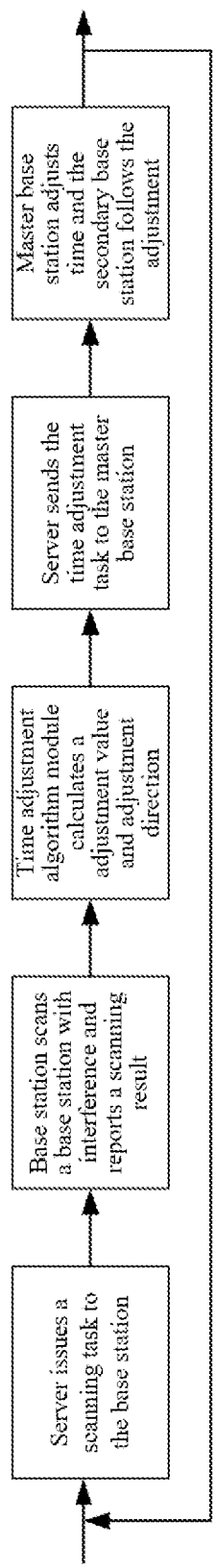
FIG. 8 is a flow diagram of another method of dynamically adjusting timing between adjacent networks in a synchronous network according to an embodiment of this disclosure.
Figure 9:
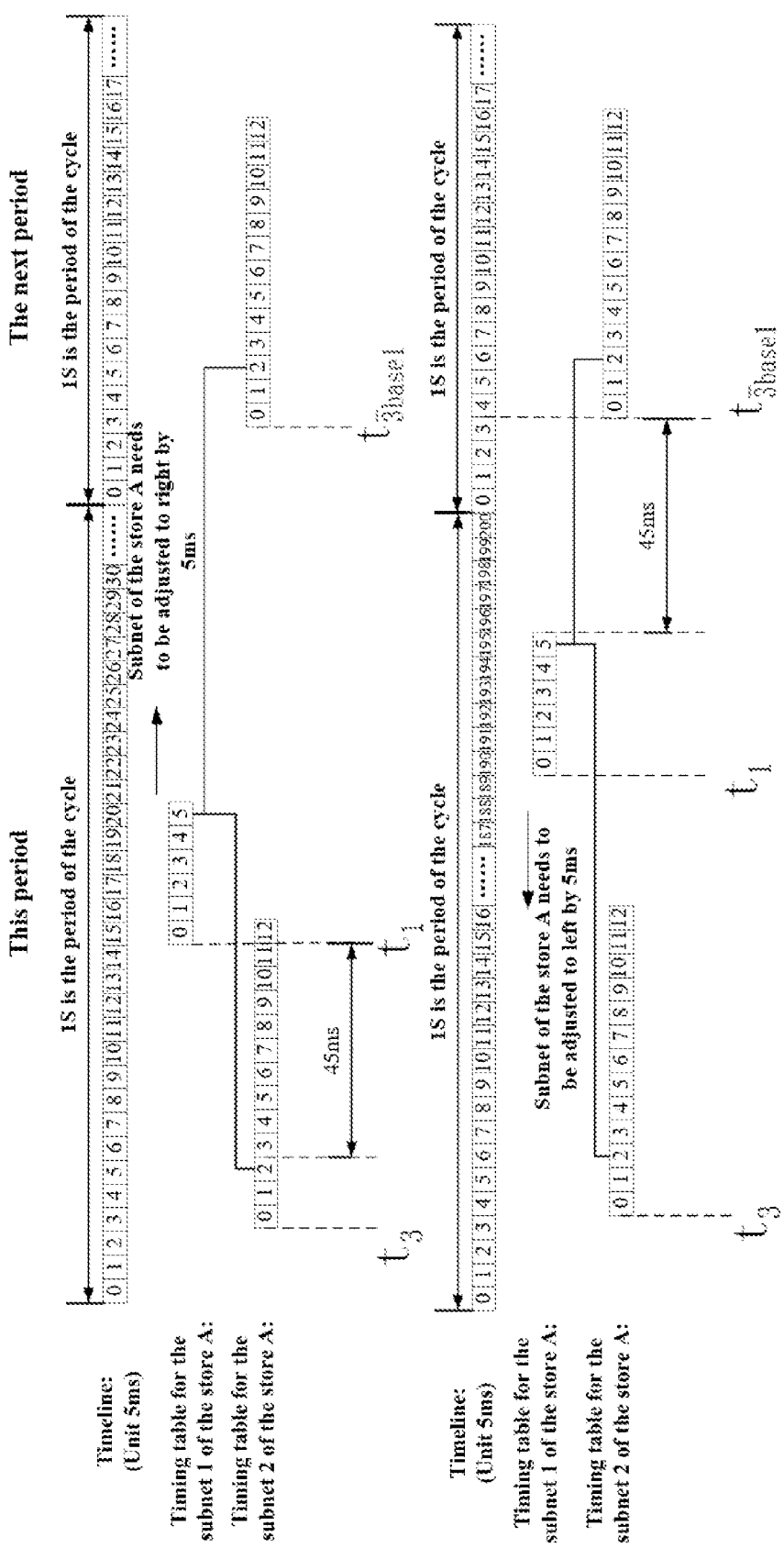
FIG. 9 is a schematic diagram of another timing table adjustment according to an embodiment of this disclosure.

FIG. 8 is a flow diagram of another method of dynamically adjusting timing between adjacent networks in a synchronous network according to an embodiment of this disclosure. As shown in FIG. 8, the method of dynamically adjusting timing includes the steps of:

1. issuing a scanning task: when the store is initially established or the network within the store is in a synchronous state, the server judges whether the base station meets the requirement for issuing the interference scanning task every fixed period (usually 32 s). If the requirement is met, the server issues the interference scanning task to all the base stations in the store, and then waits to receive the interference scanning result reported by the base station.
2. reporting, by the base station, the interference scanning result: after receiving the interference scanning task issued by the server, the base station scans surrounding base stations. A plurality of interfering base stations may be scanned by the same one base station. The base station reports all scanned base station store numbers, network number, and base station offset numbers and a start moment difference between a network where a current base station is located and a network where the interfering base stations are located.
3. processing the scanning result: the server collects results in this round reported by the base station, filters out a scanning result of the same network as the reported base station in the results reported by the base station, sorts out the interference relationship between the networks, and determines the maximum interference base station offset number between the networks. As shown in FIG. 7, the base stations that interfere with the network 1 (subnet 1) and the network 2 (subnet 2) involve a base station No. 2 of the network 1 and a base station No. 1 of the network 2. The relative position of the two networks on the timeline of this period can be determined based on the reported time interval. Taking calculations of adjustment time and adjustment direction of the network 1 as an example, it is necessary to mirror network 2 to a previous period, while judgments are made on whether a time difference between the base station No. 2 of the network 1 (the maximum interfering base station serial number of the network 1) and the start moment of the network 2 is greater than GAP (usually 50 ms); whether the time difference between the base station No. 1 of the mirror network of the network 2 (the maximum interfering base station serial number of the network 2) and the start moment of the network 1 is greater than GAP, if any one of the requirements is not met, an adjustment is required; and the time adjustment between networks in the same store is performed in a similar manner. As shown in FIG. 9, the time and direction that need to be adjusted for each network is calculated based on a time adjustment algorithm. The principle of adjustment allows a time interval between a start point of the network and the maximum interfering base station serial number of the mirror network of the interfering network to be greater than the GAP, and also allows a time interval between a moment corresponding to the maximum interfering base station serial number of the network and a start moment of the interfering network to be greater than the GAP.
4. issuing adjustment tasks: generating adjustment tasks and issuing the adjustment task to the master ap in each network based on the network value to be adjusted and the direction to be adjusted as calculated by the server. If no adjustment is required, no adjustment task is issued. The adjustment task may be issued a plurality of times in one period, and only a maximum time adjustment of 1 ms is issued to the master base station of each network each time. The task is sent regularly based on the calculated number of times. A next period is about to be entered after all adjustment tasks have already been sent.
5. adjusting base station time: after receiving the time adjustment task issued by the server, the master base station adjusts the time of the master base station. At the same time, the synchronization time adjusted by the master base station is sent to the secondary base stations level by level, so that the time of the entire network is adjusted.

In some embodiments, after the time adjustment solution is applied between the networks, the relative time difference between the networks and the time difference between the networks that can be scanned by each other (i.e., between the two networks with interference) may be continuously monitored, so as to adjust the time difference to the interval GAP (usually 50 ms) between the networks and maintain stability, therefore, the interference between the networks is significantly reduced, the stability of the networks is greatly improved and a phenomenon of base station out-of-synchronization is reduced.

In a second aspect, some embodiments of this disclosure provide an electronic shelf label system, which adjusts timing using the method of dynamically adjusting timing between adjacent networks in a synchronous network.

All or part of the processes in the method of the embodiments can be completed by instructing relevant hardware through a computer program, and the program may be stored in one non-volatile computer-readable storage medium. When executed, the program may include the processes of the embodiments of the above method. Any reference to a memory, a storage, a database, or other medium used in the embodiments provided herein may include a non-volatile and/or volatile memory. The non-volatile memory may include: a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an explanation rather than limitation, the RAM is available in a plurality of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronous link DRAM (SL- DRAM), a Rambus direct RAM (RDRAM), a direct memory bus dynamic RAM (DRDRAM), and a memory bus dynamic RAM (RDRAM).

Relational terms such as "first" and "second" herein are only used to distinguish one entity or operation from another entity or operation and do not essentially require or suggest any actual relationship or order between these entities or operations. The terms "comprising", "including" or any other variation thereof are intended to encompass a non-exclusive inclusion such that a process, method, article or device including a series of elements not only includes those elements, but also includes other elements that are not explicitly listed, or also includes elements inherent in such a process, method, article or device. Without further limitations, the elements limited by the statement "comprising a . . . " do not exclude the presence of other identical elements in the process, method, article or device that includes the elements.

What is claimed is:

1. A method for avoiding timing interference in a synchronous network, comprising:
    controlling, by a server, each base station in the synchronous network in each scanning period to perform an interference scanning with a predetermined time duration, so that each base station sends an interference scanning result to the server, wherein the interference scanning result comprises timing characteristic information of an interfering base station, and the synchronous network comprises a current network; and
    determining, by the server, timing adjustment of the current network based on the interference scanning result of each base station in the synchronous network.

2. The method according to claim 1, determining the timing adjustment of the current network based on the interference scanning result of each base station in the synchronous network comprises:
    constructing, by the server, an interference timing relationship diagram between an adjacent network and the current network based on the interference scanning result of each base station in the synchronous network; and
    determining, by the server, a timing adjustment direction and a timing adjustment value of the current network based on the interference timing relationship diagram.

3. The method according to claim 2, further comprising:
    processing, by the server, a timing adjustment of one or more current networks simultaneously, generating a corresponding adjustment task from the timing adjustment direction and the timing adjustment value of the current network, and sending the adjustment task to a master base station in the current network, such that the master base station and a secondary base station dynamically adjust timing based on the adjustment task.

4. The method according to claim 2, wherein the timing characteristic information of an interfering base station comprises a scanned interfering base station serial number and a relative position thereof on a timeline, and
    determining the timing adjustment direction and the timing adjustment value of the current network based on the interference timing relationship diagram comprises:
    determining the timing adjustment direction and the timing adjustment value of the current network based on a relative position of adjacent networks on the timeline of a current scanning period in the interference timing relationship diagram, a serial number of each base station in one or more adjacent networks, and a time deviation relationship between interfering base stations.

5. The method according to claim 4, wherein the scanned interfering base station serial number includes: a store number, a network number and an offset serial number in a network in which the interfering base station is located.

6. The method according to claim 5, wherein before determining the timing adjustment direction and the timing adjustment value of the current network, the method further comprises:
    obtaining, by the server, a reference network that has an interference relationship with the current network based on the interference timing relationship diagram;
    obtaining, by the server, a maximum base station serial number with a base station interference relationship in the current network based on the interference timing relationship diagram;
    determining, by the server, a mirroring direction of the reference network based on a relative position relationship between the current network and a corresponding reference network on the timeline of current scanning period;
    obtaining, by the server, a mirroring timing table of the reference network of the current network in a corresponding period based on the mirroring direction of the reference network, wherein the mirror timing table is a timing table corresponding to a mirroring network of the reference network; and
    judging, by the server, whether the current network needs a timing adjustment based on a reference network timing table of the current network and the mirror timing table of the reference network in a corresponding period.

7. The method according to claim 6, wherein determining the timing adjustment direction and the timing adjustment value of the current network in response to determining that the current network needs a timing adjustment based on the reference network timing table of the current network and the mirror timing table of the reference network in a corresponding period, comprises:
    determining a first time difference between the current network and the reference network, and a second time difference between the current network and the mirroring network of the reference network, based on a start moment of the current network, a start moment of the reference network of the current network, a start moment of the mirroring network of the reference network, a moment on the timeline corresponding to a maximum interfering base station offset number of the reference network, and a moment on the timeline corresponding to a maximum interfering base station offset number of the current network;
    determining a first adjustment value of the current network relative to the reference network and a second adjustment value of the current network relative to the mirroring network of the reference network based on a preset interval threshold, the first time difference and the second time difference; and
    obtaining the timing adjustment direction and the timing adjustment value of the current network relative to the reference network based on the first adjustment value and the second adjustment value.

8. The method according to claim 7, wherein the timing adjustment direction indicates shifting right relative to the timeline when the timing adjustment value is a positive value; and the timing adjustment direction indicates shifting left relative to the timeline when the timing adjustment value is a negative value.

9. The method according to claim 4, wherein constructing, by the server, the interference timing relationship diagram between the adjacent network and the current network based on the interference scanning result of each base station in the synchronous network, comprises:
- constructing, by the server, the timeline of current scanning period, and constructing the corresponding timing table for each network in the synchronous network in a current scanning period based on the timeline of current scanning period;
- filtering out, by the server, base station information with a same network as a reported base station in all interference scanning results based on the interference scanning result of each base station, and obtaining a target interference scanning result; and
- constructing, by the server, a time deviation relationship between a corresponding base station serial number in each timing table and a corresponding interfering base station serial number based on the target interference scanning result, and generating the interference timing relationship diagram.

10. The method according to claim 3, wherein generating the corresponding adjustment task from the timing adjustment direction and the timing adjustment value of each of the current network, respectively, comprises:
- dividing the timing adjustment value of the current network into a plurality of single adjustment values based on a preset number of adjustment times; and
- generating a plurality of adjustment tasks based on the timing adjustment direction and the plurality of single adjustment values, respectively;

or,
- obtaining a number of current adjustment times based on the timing adjustment value and a preset single adjustment value; and
- generating a plurality of adjustment tasks based on the number of current adjustment times, the timing adjustment value and the preset single adjustment value, and sending the adjustment tasks to the base station a plurality of times within a same adjustment period.

11. The method according to claim 2, wherein the server repeatedly controls the base station to perform interference scanning based on a scanning period and cyclically performs a dynamic timing adjustment between adjacent networks.

12. An electronic shelf label system, comprising:
- a plurality of base stations, and a server communicating with the plurality of base stations;
- wherein the server is configured to perform acts comprising:
  - controlling each base station in a synchronous network in each scanning period to perform an interference scanning with a predetermined time duration, so that each base station sends an interference scanning result to the server, wherein the interference scanning result comprises timing characteristic information of an interfering base station, and the synchronous network comprises a current network; and
  - determining timing adjustment of a current network based on the interference scanning result of each base station in the synchronous network.

13. The electronic shelf label system according to claim 12, wherein determining the timing adjustment of the current network based on the interference scanning result of each base station in the synchronous network comprises:
- constructing an interference timing relationship diagram between an adjacent network and the current network based on the interference scanning result of each base station in the synchronous network; and
- determining a timing adjustment direction and a timing adjustment value of the current network based on the interference timing relationship diagram.

14. The electronic shelf label system according to claim 13, wherein the method further comprises:
- processing a timing adjustment of one or more current networks simultaneously, generating a corresponding adjustment task from the timing adjustment direction and the timing adjustment value of the current network, and sending the adjustment task to a master base station in the current network in a processing of each of the current networks, such that the master base station and a secondary base station dynamically adjust timing based on the adjustment task.

15. The electronic shelf label system according to claim 13, wherein the timing characteristic information of an interfering base station comprises a scanned interfering base station serial number and a relative position thereof on a timeline, and
- determining the timing adjustment direction and the timing adjustment value of the current network based on the interference timing relationship diagram comprises:
  - determining the timing adjustment direction and the timing adjustment value of the current network based on a relative position of adjacent networks on the timeline of current scanning period in the interference timing relationship diagram, a serial number of each base station in one or more adjacent networks, and a time deviation relationship between interfering base stations.

16. The electronic shelf label system according to claim 15, wherein the scanned interfering base station serial number includes: a store number, a network number and an offset serial number in a network in which the interfering base station is located.

17. The electronic shelf label system according to claim 16, wherein before determining the timing adjustment direction and the timing adjustment value of the current network, the server is configured to perform acts further comprising:
- obtaining a reference network that has an interference relationship with the current network based on the interference timing relationship diagram;
- obtaining a maximum base station serial number with a base station interference relationship in the current network based on the interference timing relationship diagram;
- determining a mirroring direction of the reference network based on a relative position relationship between the current network and the corresponding reference network on the timeline of current scanning period;
- obtaining a mirroring timing table of the reference network of the current network in a corresponding period based on the mirroring direction of the reference network, wherein the mirror timing table is a timing table corresponding to a mirroring network of the reference network; and
- judging whether the current network needs a timing adjustment based on a reference network timing table of the current network and the mirror timing table of the reference network in a corresponding period.

18. The electronic shelf label system according to claim 17, wherein determining the timing adjustment direction and the timing adjustment value of the current network in response to determining that the current network needs a timing adjustment based on a reference network timing table of the current network and the mirror timing table of the reference network in a corresponding period, comprises:

determining a first time difference between the current network and the reference network, and a second time difference between the current network and the mirroring network of the reference network, based on a start moment of the current network, a start moment of the reference network of the current network, a start moment of the mirroring network of the reference network, a moment on the timeline corresponding to a maximum interfering base station offset number of the reference network, and a moment on a timeline corresponding to a maximum interfering base station offset number of the current network;

determining a first adjustment value of the current network relative to the reference network and a second adjustment value of the current network relative to the mirroring network of the reference network based on a preset interval threshold, the first time difference and the second time difference; and obtaining the timing adjustment direction and the timing adjustment value of the current network relative to the reference network based on the first adjustment value and the second adjustment value.

19. The electronic shelf label system according to claim 15, wherein constructing the interference timing relationship diagram between the adjacent network and the current network based on the interference scanning result of each base station in the synchronous network, comprises:

constructing the timeline of current scanning period, and constructing the corresponding timing table for each network in the synchronous network in a current scanning period based on the timeline of current scanning period;

filtering out base station information with a same network as a reported base station in all interference scanning results based on the interference scanning result of each base station, and obtaining a target interference scanning result; and constructing a time deviation relationship between a corresponding base station serial number in each timing table and a corresponding interfering base station serial number based on the target interference scanning result, and generating the interference timing relationship diagram; and wherein generating the corresponding adjustment task from the timing adjustment direction and the timing adjustment value of each of the current network, respectively, comprises:

dividing the timing adjustment value of the current network into a plurality of single adjustment values based on a preset number of adjustment times; and generating, by the server, a plurality of adjustment tasks based on the timing adjustment direction and the plurality of single adjustment values, respectively;

or, obtaining a number of current adjustment times based on the timing adjustment value and a preset single adjustment value; and generating a plurality of adjustment tasks based on the number of current adjustment times, the timing adjustment value and the preset single adjustment value, and sending the adjustment tasks to the base station a plurality of times within a same adjustment period.

20. A non-transitory computer readable storage medium storing a plurality of programs for execution by a server having one or more processors, wherein the plurality of programs, when executed by the one or more processors, cause the server to perform acts comprising:

controlling each base station in the synchronous network in each scanning period to perform an interference scanning with a predetermined time duration, so that each base station sends an interference scanning result to the server, wherein the interference scanning result comprises timing characteristic information of an interfering base station, and the synchronous network comprises a current network; and determining timing adjustment of the current network based on the interference scanning result of each base station in the synchronous network.

\* \* \* \* \*